April 19, 1966  R. C. VICKERY  3,247,386
MODULATION OF LASERS BY ULTRASONIC
VARIATION OF ABSORPTION BANDS
Filed Oct. 11, 1962
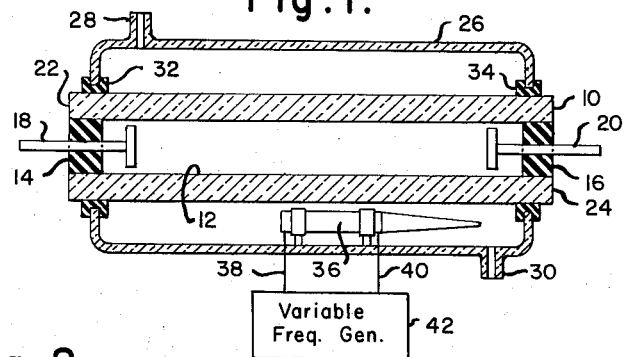
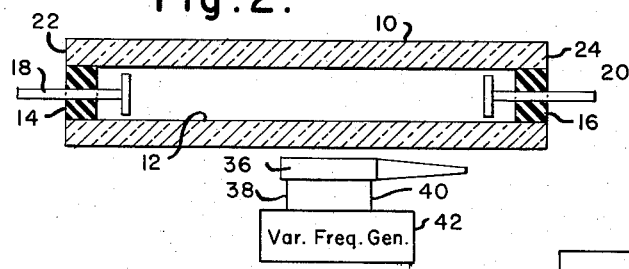
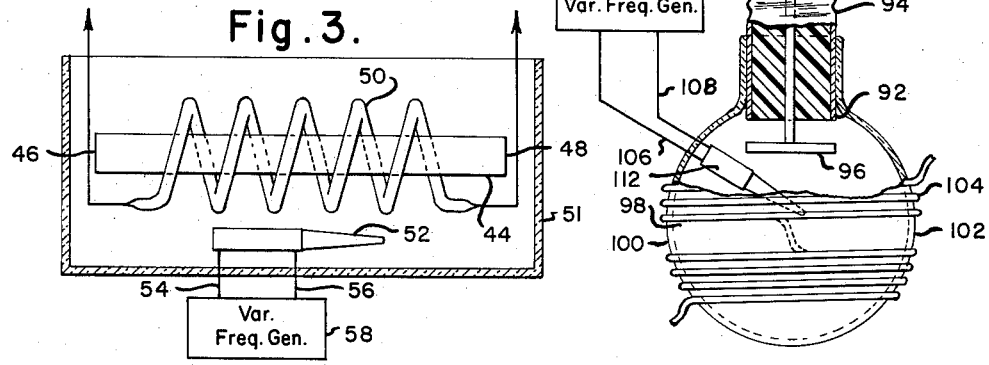
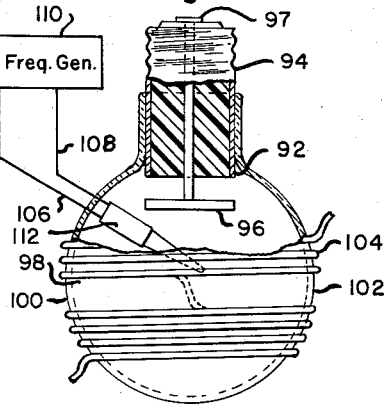
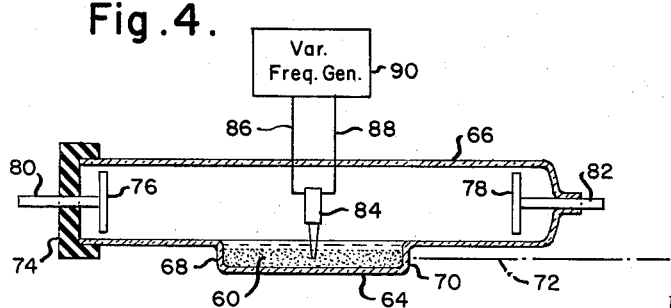
INVENTOR.
Ronald C. Vickery
BY
Attorney

United States Patent Office 3,247,386
Patented Apr. 19, 1966

3,247,386
MODULATION OF LASERS BY ULTRASONIC
VARIATION OF ABSORPTION BANDS
Ronald C. Vickery, Saxonburg, Pa., assignor to
Joseph V. Fisher, Valencia, Pa.
Filed Oct. 11, 1962, Ser. No. 229,824
5 Claims. (Cl. 250—199)

This invention relates to devices for amplifying wave energy by stimulated emission of radiation, and more particularly to devices for modulating an output beam of radiation produced by stimulated emission.

The present invention is particularly concerned with materials for amplifying light energy by stimulated emission of radiation (i.e., "lasers"). Generally speaking, lasers may be defined as devices for amplifying or generating light by utilizing molecules in the excited state of a wave transition. Interaction between these excited molecules and an incident wave energy field produces additional radiation and hence amplification by "stimulated emission." The operation of lasers is dependent upon the fact that in certain materials the electrons surrounding the nucleus of an atom may be in different energy states. These energy states may be thought of as arising from the interaction of the electron spins with internal or external fields. We may, therefore, refer to them as electron "spin states." The energies of the electron spin states may be varied by an external wave energy field; and the energy difference between two given electron spin states is determined by the magnitude of the external field.

The phenomenon of laser action can be summarized as related to the "pumping" of electrons, or rather their spin energy levels, to an excited energy state above their normal or "ground" energy level. After the energy levels of the electron spins are raised to an excited state above their normal or ground level, they may revert back to the ground level, whereupon the energy absorbed in the "pumping" process is liberated; and, in the passage of such liberated energy quanta through the material menstruum, an orientation and accretion of such energy occurs until it is emitted as a coherent beam of rather specific wave length. The wave length, or frequency, of this emitted beam is a function of the discrete energy levels of the paramagnetic ion whose electron spins are pumped, and the pumping energy required is also a function of those levels.

For example, part of the electron spins in certain paramagnetic materials may be at a lower energy state $E_1$, while the remainder may be at a higher energy state $E_2$. The material capable of amplifying wave energy by stimulated emission of radiation is in thermal equilibrium, corresponding to a normal or relaxed condition, when there is an excess electron spin population in the lower energy state $E_1$. Electron spins in the energy states $E_1$ and $E_2$ can interact with a radiation field of appropriate frequency and either absorb energy from the radiation field while advancing to a state of greater energy or, under the influence of the radiation field, can give up some of their energy and drop to a state of lower energy. The amount of energy thus transferred, (i.e., $E_2-E_1$) is related to the frequency of the radiation field by the following equation:

$$E_2-E_1=hV$$

where $h$ is Planck's constant and $V$ is the frequency of the emitted radiation.

In the case of a laser, the material capable of amplifying wave energy by stimulated emission of radiation is placed within a resonator comprising a pair of spaced reflective surfaces separated by a distance equal to an even multiple of the wave length which it is desired to amplify. By pumping light energies into the material, a steady oscillation can be built up between the reflective surfaces; and if one of the reflective surfaces is only partially reflecting, a portion of the amplified energy will pass therethrough as a coherent beam of extremely high intensity.

In U.S. Patent No. 3,166,673, issued on January 19, 1965 to R. C. Vickery and J. V. Fisher, a system is described wherein a solid-state host material is doped with a ferromagnetic or highly paramagnetic material which does not unduly affect the transmittancy of the system nor quench the fluorescence of the emitting ions by magnetic interaction. Opposing ends of the material are reflective as described above, with one of the ends being only partially reflective to permit emitted light to pass therethrough. Such a system is then exposed to a magnetic or helical electrical field, the intensity of which is varied as required to effect modulation. Because of the ferromagnetic nature of the excited solid-state material, a magnetostrictive effect is observed upon application of the magnetic field. Assuming that the magnetic field is applied in the proper direction, this then alters the distance between the reflecting ends of the crystal or rod which form the boundaries of the resonating cavity. Because the length of the resonating cavity is thus changed, then also is the frequency of the emitted radiation. That is, the emitted frequency fluctuates under the influence of the applied fluctuating magnetic field.

The present invention also provides a means for effecting modulation of output radiation from a laser; however, in contrast to the arrangement shown in the aforesaid Patent No. 3,166,673, the present invention does not require ferromagnetic properties in the laser material and achieves modulation by variation of the absorption bands of the paramagnetic material which is pumped with light energy. As is known, the band of frequencies at which light energy may be pumped into a paramagnetic material to raise the energy level of paramagnetic ions therein from level $E_1$ to $E_2$ mentioned above is called its "absorption band"; while the band of frequencies at which light will be emitted from the paramagnetic material as the ions fall from energy level $E_2$ to level $E_1$ is called its "emission band." The frequency and magnitude of radiation emitted from a laser material is dependent upon its emission band which, in turn, varies as the absorption band is varied. Thus, laser action of a paramagnetic ion may be considered dependent upon the absorption of electromagnetic energy at specific frequencies which are defined by the discrete absorption bands exhibited by the emitting material. If these absorption bands are altered or modulated in any way then also is the power absorbed modulated and, by the law of reciprocal effect, so also is the emission output.

The present invention resides in the discovery that the absorption bands exhibited by the paramagnetic ions responsible for laser action are strongly affected and in some instances eliminated by the application of wave energy fields having frequencies lower than the frequency of the exciting wave energy pumped into the laser material. More specifically, the invention resides in the discovery that the absorption bands of laser materials can be made to vary upon subjecting them to sonic and ultrasonic wave energy. For example, I have found, upon subjecting a neodymium compound to an ultrasonic field (25 kilocycles to 200 kilocycles), that the principal absorption band at 576 m$\mu$ lessened in its intensity, and the 522 m$\mu$ band disappeared and reappeared in resonance with the applied frequency or an harmonic thereof. Similarly, with a praseodymium based system, upon "sounding," the yellow edge of the 444 m$\mu$ absorption complex disappeared and the 580 m$\mu$ complex decreased in intensity—again in harmonic resonance with the applied field.

Because the absorption bands indicated are those through which input energy is transmitted for laser action, the emitted coherent radiation can therefore be modulated by modulating the absorbed frequency upon imposing a wave energy field upon the emitting system, and particularly an ultrasonic, magnetic or electrical (i.e., R.F.) wave energy field. The present application is directed toward the overall idea of modulating laser action by variation of absorption bands, and specifically covers the concept of varying absorption bands with the use of ultrasonic energy.

The above and other objects and features of the invention will become apparent from the following detailed description taken in connection with the accompanying drawings which form a part of this specification, and in which:

FIGURE 1 is an illustration of one embodiment of the invention wherein the laser material is surrounded by a water jacket which is used as a transmitting medium for ultrasonic wave energy;

FIG. 2 is an illustration of another embodiment of the invention wherein air is used as the transmitting medium for ultrasonic wave energy;

FIG. 3 is an illustration of still another embodiment of the invention in which the laser material is pumped by means of a helical flash tube;

FIG. 4 is an illustration of an embodiment of the invention wherein the laser material comprises a liquid; and FIG. 5 is an illustration of the invention wherein the laser material comprises a gas.

Referring now to the drawings, and particularly to FIG. 1, the laser device shown is of the general type described in copending application Serial No. 212,924, filed July 27, 1962 wherein the laser material is subjected directly to pumping wave energy before that wave energy passes through any medium such as glass or quartz which attenuates it. It comprises a single crystal of paramagnetic material 10 which has been bored to provide an axially extending cavity 12 therein. The opposite ends of the cavity 12 are sealed by means of insulating seals 14 and 16, while electrodes 18 and 20 extend through the seals and are adapted for connection to a source of electrical potential. The cavity 12 is filled with xenon and/or mercury vapors to produce ultraviolet radiation upon the establishment of a potential between the electrodes 18 and 20. The annular ends 22 and 24 are silvered, the end 24, for example, being only partially reflecting to permit emitted light to pass therethrough.

In the operation of the device of FIG. 1, an electrical potential is established between the electrodes 18 and 20 by known procedures which can involve the flash discharge of a previously charged capacitor bank or the application of a high intensity direct or alternating current source for continuous illumination. In this process, the xenon and/or mercury vapors within the cavity 12 will ionize to produce ultraviolet wave energy. This wave energy will impinge upon the wall of cavity 12 and be "pumped into" the crystal 10 to raise the energy levels of the electron spins of the paramagnetic ions in crystal 10 from energy level $E_1$ to level $E_2$ as described above. When the energy level of the ions falls from $E_2$ to $E_1$, light will be emitted by the crystal 10; and, since the reflective ends 22 and 24 are separated by an amount substantially equal to an even multiple of the band of desired emission wave lengths, a resonant cavity effect is produced whereby a steady oscillation is built up between the opposite ends 22 and 24. Because the right end 24 is only partially reflective, at least some of the light will pass therethrough as amplified wave energy produced by stimulated emission of radiation.

The single crystal 10 may be of the general type described in copending application Serial No. 194,151, filed May 11, 1962. Specifically, it is a single crystal comprising a host material doped with a rare earth or transition element, and having a purity of 99% or greater. For example, the host material may be calcium fluoride, barium fluoride, cadmium fluoride, manganese oxide, or any of the other host materials described in the aforesaid application Serial No. 194,151. This host material is doped with about 0.005% to 5% by weight of a rare earth or transition element, depending upon requirements. As a specific example, the crystal 10 may be calcium fluoride containing terbium, or sodium borate containing terbium, in which case the terbium ions can be made to fluoresce in the visible green region (i.e., about 5100 A. to 5800 A.).

Surrounding the crystal 10 is a water jacket 26 having an inlet port 28 and an outlet port 30 such that a cooling liquid may be conducted through the jacket 26 if desired. The opposite ends of the water jacket 26 are secured to the outer periphery of the crystal 10 by means of resilient or the like seals 32 and 34.

Disposed within the water jacket 26 is an ultrasonic transducer 36 connected through leads 38 and 40 to a variable frequency generator 42, the arrangement being such that the generator 42 will cause the transducer 36 to produce ultrasonic vibrations of varying frequency in the frequency range of about 25 kilocycles to 200 kilocycles. In this process, the ultrasonic vibrations will be transmitted through the liquid medium in the water jacket 26 to the crystal 10; and as the frequency of the ultrasonic vibrations varies, so also will the absorption bands exhibited by the crystal 10 and, hence, the frequency and magnitude of the output radiation from the partially silvered end 24 of the crystal. By varying the frequency of the generator 42 in accordance with an intelligence signal, the variations in frequency and magnitude of the radiation output from crystal 10 will also reflect this intelligence which, if desired, may be detected and demodulated at a distant point.

In FIG. 2 another embodiment of the invention is shown which is similar to that of FIG. 1, elements in FIG. 2 which correspond to those of FIG. 1 being identified by like reference numerals. In this latter case, however, the water jacket 26 is eliminated and the ultrasonic transducer 36 is simply disposed in the air adjacent the crystal 10. In this particular embodiment, the air acts as a transmitting medium for the ultrasonic vibrations between the transducer 36 and the crystal 10; and although a severe attenuation will occur in the vibrations in passing through the air, they will nevertheless be strong enough to effect a variation in the absorption bands of crystal 10 and, hence, a modulation of the output radiation from the crystal.

With reference now to FIG. 3, the crystal 44 which may be of composition similar to the crystal 10 of FIGS. 1 and 2 comprises a solid rod having its left end 46 completely reflective and its right end 48 only partially reflective so that amplified wave energy can pass therethrough. The crystal 44 is pumped in this case by means of a helical flash tube 50 which surrounds the crystal in accordance with usual practice and which produces wave energy in the light spectrum, preferably ultrasonic wave energy. The crystal and flash tube in this case are disposed within a tank 51 which may, for example, contain liquid nitrogen 53 for cooling purposes. If the light emitted by the crystal 44 is in the visible region, the tank 51 should be formed from transparent material to permit the light to pass therethrough. An ultrasonic transducer 52 is disposed adjacent the crystal 44 in the liquid nitrogen 53 and is connected through leads 54 and 56 to a variable frequency generator 58. The operation of the device of FIG. 3 is similar to that of FIG. 1 wherein a surrounding liquid is used as a transmitting medium for the ultrasonic vibrations between the transducer 52 and crystal 44.

In FIG. 4 an embodiment of the invention is shown wherein the paramagnetic material comprises a liquid 60 disposed within a lower cavity 64 formed in a glass envelope 66. The opposite ends 68 and 70 of the cavity 64 are silvered with the end 68 being totally reflecting and end 70 being only partially reflecting whereby part of the emitted light may pass therethrough along the approximate path 72. The outer glass envelope 66 is provided at its one end with an insulating or the like cap 74 and is sealed at its opposite end to provide an air-tight enclosure. Positioned within the envelope 66 at its opposite ends are a pair of electrodes 76 and 78, while connected to the electrodes 76 and 78 and projecting through the cap 74 and envelope 66 are leads 80 and 82, respectively, adapted for connection to a source of electrical potential whereby this potential will exist between the electrodes 76 and 78.

As in the embodiments of FIGS. 1 and 2, the volume within the envelope 66 is filled with a media of xenon and/or mercury vapors such that ultraviolet radiation will be produced by an electrical discharge between the electrodes 76 and 78.

The liquid laser material 60 may be of the type described in copending application Serial No. 211,097, filed July 19, 1962. It may, for example, comprise terbium anthranilate dissolved in acetone. With this material, fluorescence in the green can be observed. Alternatively, dyprosium anthranilate, chromium benzoyl acetonate, or the iron complex with O-hydroxy-benzophenone dissolved in an organic solvent can be used for the liquid paramagnetic material 60.

Projecting downwardly into the liquid paramagnetic material 60 is an ultrasonic transducer 84 having leads 86 and 88 projecting through the glass envelope 66 and adapted for connection to a variable frequency generator 90 similar to the generators already described. With this arrangement, the ultrasonic vibrations from transducer 84 will be induced directly into the liquid laser material 60 and, hence, will change its emission bands and modulate the output radiation therefrom.

In FIG. 5 an embodiment of the invention is shown wherein one electrode 92 forms a part of a conventional lamp socket 94. The other electrode 96 is connected to the central contact 97 of the socket 94 in accordance with usual practice. The envelope 98 surrounding the electrodes 92 and 96 is filled with xenon and/or mercury vapors to produce the required ultraviolet radiation. Also included in the envelope 98 is a paramagnetic material, hereinafter described, which will volatilize upon the application of heat to form a gas. This gas will mix with the xenon and/or mercury vapors which are used to produce the required ultraviolet radiation. In this case, the envelope surfaces at 100 and 102 are internally silvered to provide reflecting surfaces, only one of the surfaces being totally reflecting while the other is partially reflecting. An external heating element 104 serves to generate heat which volatilizes the radiating material. This material may be of the type shown, for example, in copending application Serial No. 211,100, filed July 19, 1962. Specific examples are cyclopentadienyl, acetylacetonate complexes of the rare earth elements.

Projecting through the glass envelope 98 are leads 106 and 108 connected to a variable frequency generator 110. Leads 106 and 108, in turn, are connected to an ultrasonic transducer 112 within the envelope 98.

In the operation of the device of FIG. 5, the paramagnetic material within the envelope 98 will be heated by coil 104 such that it will volatilize. By the establishment of a potential between electrodes 92 and 96, ultraviolet wave energy will be generated within the envelope 98 to excite or pump the paramagnetic gas. At the same time, ultrasonic vibrations will be induced by the transducer 112 to change the absorption bands of the paramagnetic gas and, hence, effect modulation of the output radiation from the device.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus for producing a modulated output beam of radiation, comprising a material capable of amplifying wave energy by stimulated emission of radiation, means for pumping wave energy into said material, and means for subjecting said material to sonic energy of varying frequency in a manner to vary the absorption bands of said material and hence the frequency and magnitude of the output beam of amplified wave energy from said material, the output frequency being varied in harmonic resonance with the frequency of the applied sonic energy or a harmonic thereof.

2. Apparatus for producing a modulated output beam of radiation, comprising a material capable of amplifying wave energy by stimulated emission of radiation, means for pumping wave energy into said material, and means for subjecting said material to ultrasonic wave energy of varying frequency in a manner to vary the absorption bands of said material and hence the frequency and magnitude of the output beam of amplified wave energy from said material.

3. Apparatus for producing a modulated output beam of radiation, comprising a material capable of amplifying wave energy by stimulated emission of radiation, means for pumping wave energy into said material, a medium surrounding said material capable of transmitting ultrasonic wave energy, and means for inducing ultrasonic vibrations of varying frequency in said medium in a manner to vary the absorption bands of said material and hence the frequency and magnitude of the output beam of amplified wave energy from said material.

4. Apparatus for producing a modulated output beam of radiation, comprising a material capable of amplifying wave energy by stimulated emission of radiation, means for pumping wave energy into said material, a liquid medium surrounding said material, and means for inducing ultrasonic vibrations of varying frequency in said liquid medium in a manner to vary the absorption bands of said material and thus the frequency and magnitude of the output beam of amplified wave energy from said material.

5. Apparatus for producing a modulated output beam of radiation, comprising a material capable of amplifying wave energy by stimulated emission of radiation, means for pumping light energy into said material, and an acoustical wave generator positioned with respect to said material such that the acoustical energy produced by the generator will be induced in said material to vary the absorption bands of said material and hence the frequency and magnitude of the output beam of amplified wave energy from said material, the output frequency being varied in harmonic resonance with the frequency of the applied acoustical energy or a harominic thereof.

(References on following page)

References Cited by the Examiner

UNITED STATES PATENTS

| | | | |
|---|---|---|---|
| 2,449,166 | 9/1948 | Hershberger | 250—199 |
| 2,929,922 | 3/1960 | Schawlow et al. | 250—199 |
| 3,079,347 | 2/1963 | Garrett et al. | 88—1 |
| 3,106,839 | 10/1963 | Sansom | 310—8.7 XR |
| 3,109,111 | 10/1963 | Wiggins | 310—8.7 XR |
| 3,117,768 | 1/1964 | Carlin | 310—8.7 XR |

FOREIGN PATENTS

| | | |
|---|---|---|
| 608,711 | 3/1962 | Belgium. |

OTHER REFERENCES

Terman: Radio Engineering, McGraw-Hill, 3rd Edit. 1947, pp. 418–432.

Singer, Advances in Quantum Electronics, Columbia Press, 1961, p. 340.

Wolff et al.: Electronics, vol. 34, No. 7, February 1961, p. 31.

Olt: Electronics, vol. 34, No. 18, May 5, 1961, pp. 88–91.

Vogel et al.: Electronics, vol. 34, Nov. 10, 1961, pp. 81–85.

DAVID G. REDINBAUGH, *Primary Examiner.*